(12) United States Patent
Tonogai et al.

(10) Patent No.: US 7,190,566 B2
(45) Date of Patent: Mar. 13, 2007

(54) LAMINATED ELECTRONIC COMPONENT

(75) Inventors: Toru Tonogai, Tokyo (JP); Tatsuya Kojima, Tokyo (JP); Shogo Murosawa, Tokyo (JP); Raitaro Masaoka, Tokyo (JP); Akira Yamaguchi, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/491,282

(22) Filed: Jul. 24, 2006

(65) Prior Publication Data

US 2007/0025054 A1    Feb. 1, 2007

(30) Foreign Application Priority Data

Aug. 1, 2005  (JP) .............................. 2005-223016

(51) Int. Cl.
*H01G 4/005* (2006.01)
*H01G 4/06* (2006.01)
(52) U.S. Cl. ....................... 361/303; 361/311; 361/309
(58) Field of Classification Search ........ 361/303–305, 361/311, 306.3, 309, 313
See application file for complete search history.

(56) References Cited

U.S. PATENT DOCUMENTS

2004/0218344 A1 * 11/2004 Ritter et al. ............. 361/306.3
2006/0039097 A1 * 2/2006 Satou ......................... 361/303
2006/0187612 A1 * 8/2006 Yamane et al. ............. 361/303

FOREIGN PATENT DOCUMENTS

| JP | 7-335473 | 12/1995 |
| JP | 10-12475 | 1/1998 |
| JP | 2005340663 A * | 12/2005 |

OTHER PUBLICATIONS

U.S. Appl. No. 11/406,352, filed Apr. 19, 2006, Kojima.

* cited by examiner

*Primary Examiner*—Eric W. Thomas
(74) *Attorney, Agent, or Firm*—Oblon, Spivak, McClelland, Maier & Neustadt, P.C.

(57) ABSTRACT

A laminated electronic component includes a ceramic body having an inner portion and a pair of outer portions disposed above and below the inner portion and a pair of external electrodes disposed on lateral sides of the ceramic body. A plurality of internal electrodes are embedded in the inner portion and alternately connected to the external electrodes. At least two layers of dummy electrodes are embedded in at least one of the outer portions and each connected to one of the external electrodes. An innermost one of the dummy electrodes has a same polarity as an adjacent outermost one of the internal electrodes. The dummy electrodes include at least one pair of adjacent dummy electrodes of opposite polarities.

5 Claims, 8 Drawing Sheets

LAMINATED ELECTRONIC COMPONENT

BACKGROUND OF THE INVENTION

1. Field of the Invention

The present invention relates to a laminated electronic component.

2. Description of the Related Art

Laminated ceramic electronic components include a laminated ceramic capacitor which has a ceramic body and external electrodes disposed on lateral sides of the ceramic body. The ceramic body has an inner portion, in which a plurality of internal electrodes are embedded, and a pair of outer portions disposed above and below the inner portion. The internal electrodes embedded in the inner portion are each connected to one of the external electrodes.

As such a conventional laminated ceramic capacitor, Japanese Unexamined Patent Application Publication No. 7-335473 discloses a laminated ceramic capacitor whose characteristics are prevented from deteriorating by providing a dummy electrode in each outer portion to thereby inhibit and prevent the infiltration of plating solution during the plating process.

On the other hand, Japanese Unexamined Patent Application Publication No. 10-12475 discloses a laminated ceramic capacitor in which the internal electrodes are spaced more in upper and lower portions of the inner portion than in a central portion of the inner portion.

In the conventional laminated ceramic capacitors, however, the inner portion with the internal electrodes and the outer portion with no internal electrode have different shrinkages during baking due to different materials, incurring the possibility of causing cracks.

In order to deal with this problem, the present inventors have considered providing a plurality of dummy electrodes in the outer portion and connecting them to the external electrodes for adjusting shrinkage, but found that there would be the possibility of short-circuit or deterioration in balance of layer composition due to embedment of an additional layer other than ceramic.

It should be noted that the technology disclosed in JP 7-335473 is directed to inhibiting the infiltration of plating solution, as set forth above. Therefore, shrinkage adjustment cannot be expected. On the other hand, the technology disclosed in JP 10-12475 is directed to the inner structure of the inner portion where the internal electrodes are alternately arranged to improve capacitance. Therefore, effects on the shrinkage of the outer portions cannot be expected.

SUMMARY OF THE INVENTION

The present invention has been developed in view of the above problem and has an object to provide a laminated electronic component which can prevent the occurrence of cracks while inhibiting short-circuit and deterioration in balance of layer composition.

In order to achieve the above object, the present invention provides a laminated electronic component comprising:

a ceramic body having an inner portion and a pair of outer portions disposed above and below the inner portion; and a pair of external electrodes disposed on lateral sides of the ceramic body, wherein a plurality of internal electrodes are embedded in the inner portion and alternately connected to the external electrodes, and at least two layers of dummy electrodes are embedded in at least one of the outer portions and each connected to one of the external electrodes, wherein an innermost one of the dummy electrodes has a same polarity as an adjacent outermost one of the internal electrodes, and the dummy electrodes include at least one pair of adjacent dummy electrodes of opposite polarities.

Preferably, at least three layers of dummy electrodes are disposed and alternately connected to the external electrodes to change in polarity every layer. Alternatively, at least three layers of dummy electrodes may be disposed to include at least one pair of adjacent dummy electrodes of a same polarity.

Preferably, at least three layers of dummy electrodes are disposed such that a distal pair of adjacent dummy electrodes are spaced more than a proximal pair of adjacent dummy electrodes relative to the inner portion.

Preferably, the dummy electrodes are made of a same material as the internal electrodes.

According to the present invention, the occurrence of cracks can be prevented while inhibiting short-circuit and deterioration in balance of layer composition.

In the case where at least three layers of dummy electrodes are disposed and alternately connected to the external electrodes to change in polarity every layer, the layer composition can be well-balanced to have a higher effect on preventing deterioration in balance.

In the case where at least three layers of dummy electrodes are disposed to include at least one pair of adjacent dummy electrodes of a same polarity, the number of pairs of adjacent dummy electrodes of opposite polarities can be minimized to have a higher effect on preventing short-circuit.

In the case where at least three layers of dummy electrodes are disposed such that a distal pair of adjacent dummy electrodes are spaced more than a proximal pair of adjacent dummy electrodes relative to the inner portion, the effect of moderating the change in shrinkage can be further enhanced to have a higher effect on preventing the occurrence of cracks.

In the case where the dummy electrodes are made of a same material as the internal electrodes, the effect of moderating the change in shrinkage can easily be ensured.

The present invention will be more fully understood from the detailed description given hereinbelow and the accompanying drawings which are given by way of illustration only, and thus are not to be considered as limiting the present invention.

DESCRIPTION OF THE PREFERRED EMBODIMENTS

Figure 1:
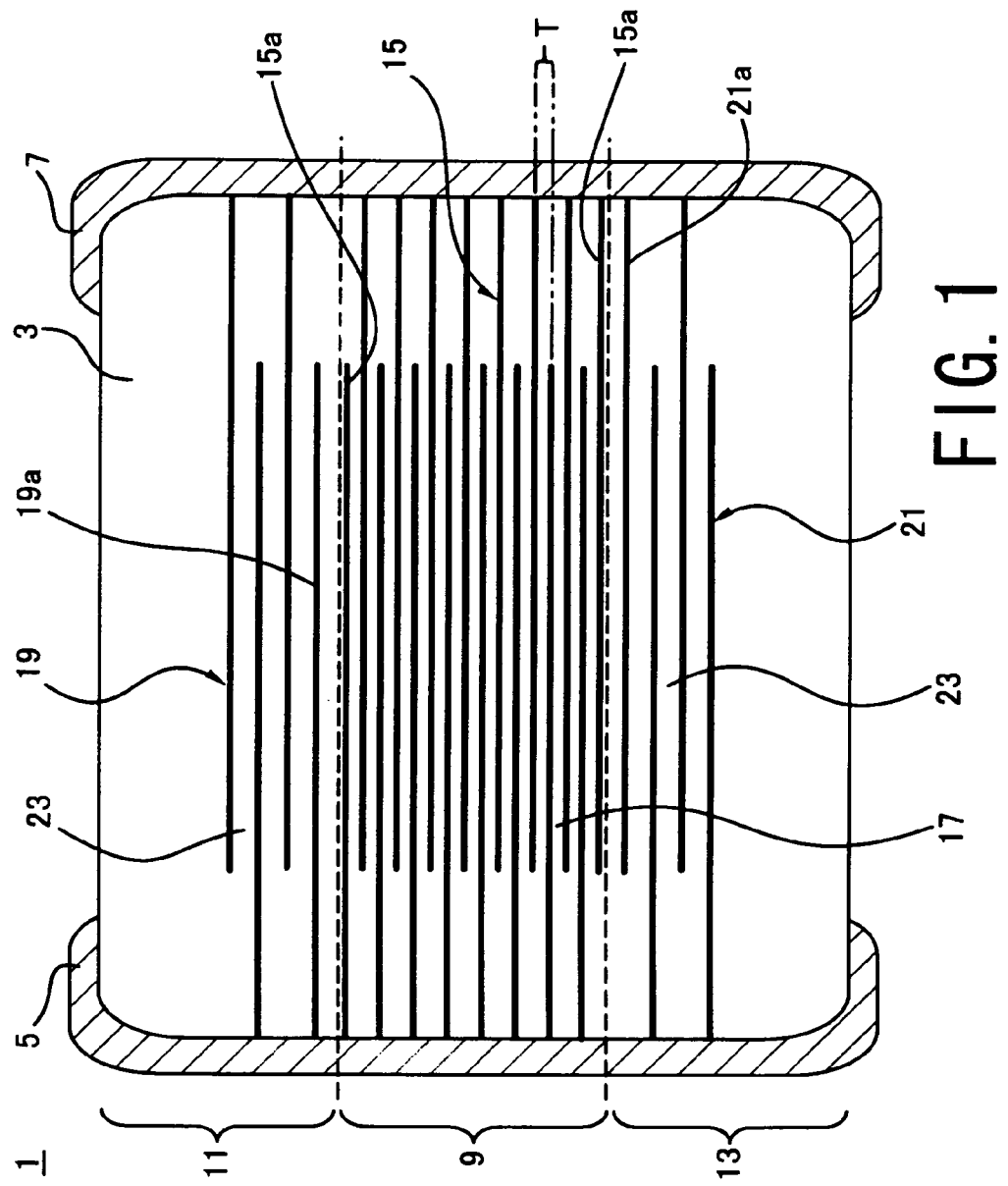
FIG. 1 is a longitudinal sectional view showing a laminated ceramic capacitor according to a first embodiment of the present invention.

Hereinbelow preferred embodiments of the present invention will be described with reference to the accompanying drawings. In the drawings, the same or similar portions will be designated by the same reference numerals. In terms of directions, the laminating direction will be taken as a vertical direction, while the direction which is perpendicular to the laminating direction and along which a pair of external electrodes are opposed to each other will be taken as a lateral direction.

Referring to the longitudinal sectional view of FIG. 1, a laminated ceramic capacitor 1 according to a first embodiment of the present invention comprises a ceramic body 3 and external electrodes 5, 7. The ceramic body 3 has an inner portion 9 and a pair of outer portions 11, 13 disposed above and below the inner portion 9. The external electrodes 5, 7 are disposed on lateral sides of the ceramic body 3.

The inner portion 9 has a plurality of internal electrodes 15 and dielectric layers 17. On the other hand, the outer portions 11, 13 have a plurality of dummy electrodes 19, 21 and dielectric layers 23. The internal electrodes 15 may be made of any suitable conductive material, for example, mainly of Ni. The dielectric layers 17, 23 may be made of any suitable dielectric material, for example, mainly of ceramic. In this embodiment, the dummy electrodes 19, 21 are made of the same material as the internal electrodes 15.

Figure 2:
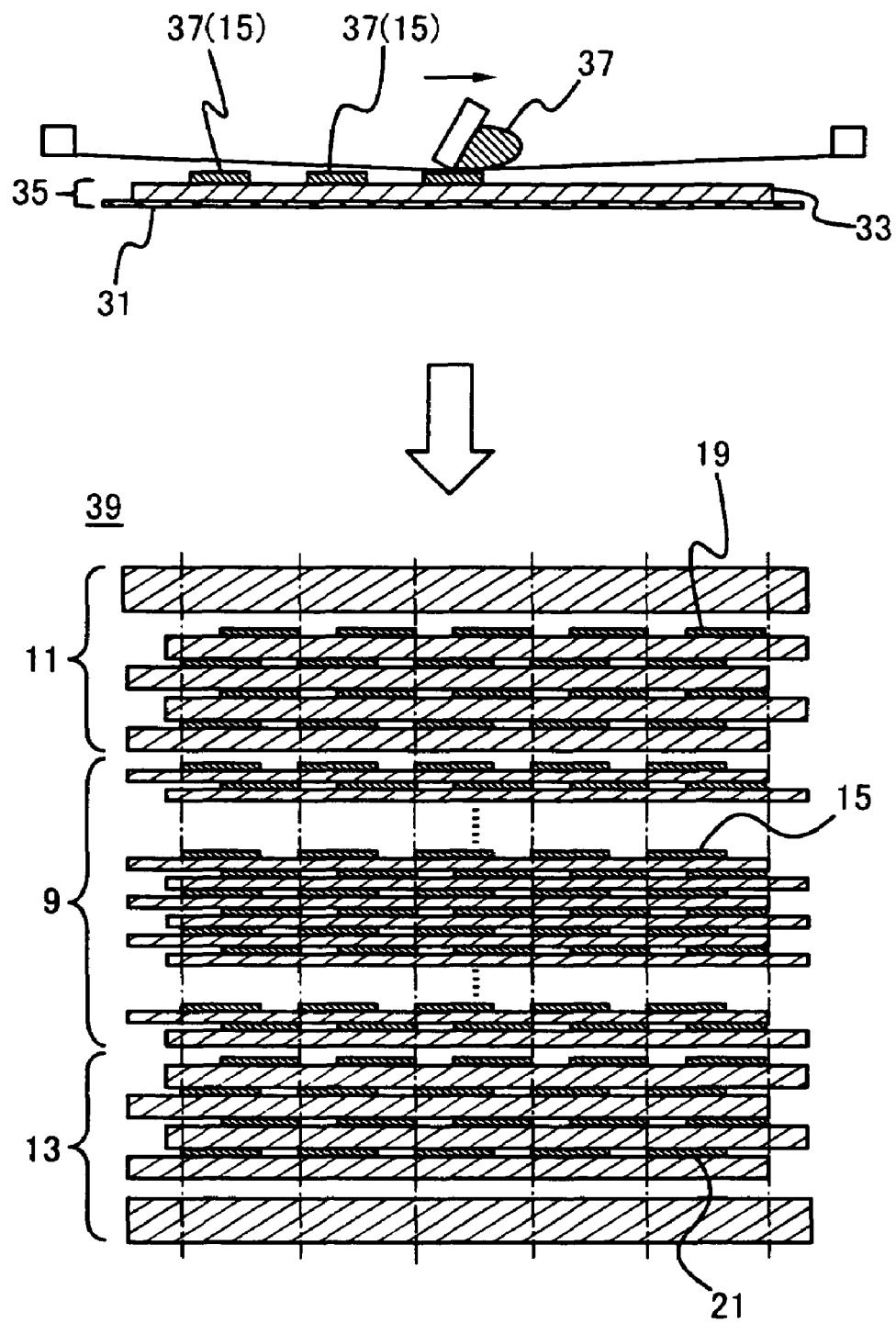
FIG. 2 is a diagram for explaining a process for manufacturing the laminated ceramic capacitor.

The process for manufacturing the inner portion 9 will be described hereinbelow. Firstly, a ceramic paste (dielectric paste) 33 containing at least ceramic powder, a binder and a solvent is applied to the upper surface of a flexible PET film 31 to obtain a so-called green sheet 35, as shown in FIG. 2. Application of the ceramic paste 33 may be performed using a doctor blade or an extrusion head, followed by a drying process.

After the drying process, a conductive paste 37 is applied to the upper surface of the green sheet 35 at spaced intervals to provide a plurality of internal electrodes 15. The conductive paste 37 may be applied such as by screen printing or gravure printing. Thus, a sheet printed with a plurality of internal electrodes 15 is prepared as a sheet material for the inner portion 9.

Likewise, a sheet material for the outer portions 11, 13 is prepared by printing a conductive paste on the upper surface of the dried green sheet at spaced intervals to provide a plurality of dummy electrodes 19, 21.

Then, a laminate 39 is prepared by stacking a plurality of the sheets printed with the internal electrodes 15 and constituting the inner portion 9, stacking a plurality of the sheets printed with the dummy electrodes 19, 21 and constituting the outer portions 11, 13 above and below them, and pressing the obtained stack under a given pressure. The laminated 39 is then cut at intervals corresponding to the size of one capacitor as shown by alternate long and short dash line in FIG. 2 to obtain a plurality of laminated chips. The laminated chip is then subjected to a binder removal treatment for burnout of an organic binder or the like, followed by baking. Finally, the external electrodes 5, 7 are attached to the opposite lateral sides of the laminated chip by baking to obtain the laminated ceramic capacitor 1 shown in FIG. 1.

Referring back to FIG. 1, the arrangement of the electrodes in the laminated ceramic capacitor 1 will now be described. The internal electrodes 15 embedded in the inner portion 9 are staggered in the lateral direction and each connected only to a corresponding one of the external electrodes 5, 7. The internal electrodes 15 are opposed to one another and vertically sandwiched between the dielectric layers 17, except the outermost ones (i.e., electrodes 15a) disposed outermost of the inner portion 9. Thus, capacitance layers are provided between adjacent upper and lower internal electrodes 15 which are connected to the external electrodes 5, 7, respectively or vice versa, to have opposite polarities.

In this embodiment, the internal electrodes 15 within the inner portion 9 are spaced a uniform distance T. In this embodiment, the boundaries between the inner portion 9 and the pair of upper and lower outer portions 11, 13 are located immediately outside the outermost internal electrodes 15a in the internal electrodes 15 spaced a uniform distance. The number of layers of the internal electrodes 15 varies depending on the required capacitance. In this embodiment, for example, about four hundred layers are provided. In the drawings, however, a fewer number of layers are shown for clarity of the drawings and easy understanding of the arrangement.

In this embodiment, four layers of dummy electrodes 19, 21 are embedded in the outer portions 11, 13, respectively. The dummy electrodes 19, 21 are opposed to one another with the dielectric layers 23 therebetween.

The dummy electrodes 19, 21 are staggered in the lateral direction and each connected only to a corresponding one of the external electrodes 5, 7. That is, the dummy electrodes 19, 21 are arranged to change in polarity every layer. Therefore, in manner of counting duplicated, the outer portions 11, 13 each have three pairs of adjacent dummy electrodes 19, 21 of opposite polarities. Innermost dummy electrodes 19a, 21a in the outer portions 11, 13 are connected to a corresponding one of the external electrodes 5, 7 to have the same polarity as an adjacent one of the outermost internal electrodes 15a.

In the laminated ceramic capacitor thus constructed, since the dummy electrodes 19, 21 are embedded in the outer portions 11, 13, the change in shrinkage between the inner portion 9 and the outer portions 11, 13 can be moderated to prevent the occurrence of cracks. Moreover, the dummy electrodes 19, 21 thus provided to prevent the occurrence of cracks will never induce short-circuit. More specifically, if the innermost dummy electrode and the outermost internal electrode have opposite polarities, they may cause an unexpected short-circuit; but in this embodiment, since the innermost dummy electrodes 19a, 21a have the same polarity as a corresponding one of the outermost internal electrodes 15*a*, the occurrence of short-circuit can be prevented.

Furthermore, the dummy electrodes 19, 21 connected to the external electrodes 5, 7 contribute to improving the connection strength of the external electrodes 5, 7. Still furthermore, since the dummy electrodes 19, 21 each extend laterally to exist over a wide area of the outer portions 11, 13, the effect of moderating the change in shrinkage can be further enhanced to prevent the occurrence of cracks more reliably. It should be noted that the feature that the innermost dummy electrodes 19*a*, 21*a* have the same polarity as a corresponding one of the outermost internal electrodes 15*a* is very advantageous because it can prevent the occurrence of short-circuit even though the dummy electrodes 19, 21 exist over such a wide area as to be connected to the external electrodes 5, 7.

Here, if only one layer of dummy electrode is provided in each outer portion, the occurrence of cracks will be prevented only on one side of the laminated ceramic capacitor, while causing a problem of deterioration in balance of layer composition. In the preferred embodiments of the present invention, however, because the dummy electrodes 19, 21 include at least one pair of adjacent dummy electrodes of opposite polarities, the layer composition is well-balanced to have the same effect of moderating the change in shrinkage on both sides of the laminated ceramic capacitor. Particularly in this embodiment, since three pairs of adjacent dummy electrodes 19, 21 of opposite polarities are provided to change in polarity every layer, the above effect becomes more prominent.

Because the dummy electrodes 19, 21 are made of the same material as the internal electrodes 15, still furthermore, the effect of moderating the change in shrinkage can easily be ensured.

Figure 3:
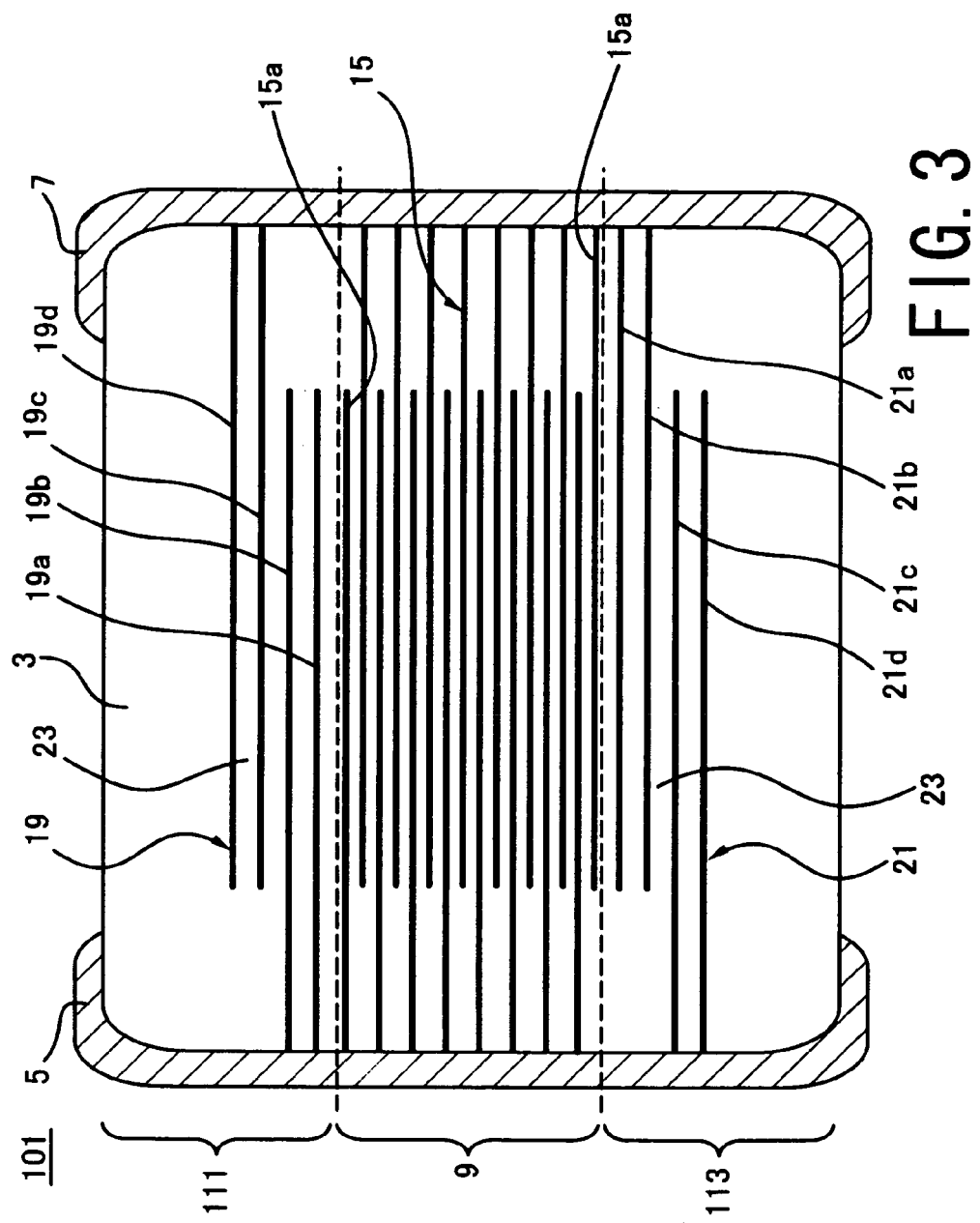
FIG. 3 is a longitudinal sectional view showing a laminated ceramic capacitor according to a second embodiment of the present invention.

Next will be described a laminated ceramic capacitor according to a second embodiment of the present invention. FIG. 3 is a sectional view corresponding to FIG. 1 and showing a laminated ceramic capacitor 101 of the second embodiment. The laminated ceramic capacitor 101 differs from the first embodiment in arrangement of dummy electrodes in a pair of outer portions 111, 113 disposed above and below the inner portion 9, but has the same construction in the other portions as the first embodiment.

In the second embodiment, four layers of dummy electrodes 19, 21 are embedded in the outer portions 111, 113, respectively. The dummy electrodes 19, 21 are opposed to one another with the dielectric layers 23 therebetween.

Although there is duplication, the outer portion 111 has one pair of adjacent dummy electrodes (19*b*, 19*c*) of opposite polarities and two pairs of adjacent dummy electrodes (19*a*, 19*b*) (19*c*, 19*d*) of the same polarity. Likewise, although there is duplication, the outer portion 113 has one pair of adjacent dummy electrodes (21*b*, 21*c*) of opposite polarities and two pairs of adjacent dummy electrodes (21*a*, 21*b*) (21*c*, 21*d*) of the same polarity.

Of the dummy electrodes 19, 21, more particularly, a plurality of layers to be connected to one external electrode are stacked as a unit, and a plurality of layers to be connected to the other external electrode are also stacked as a unit. In FIG. 3, furthermore, the number of layers of the dummy electrodes 19, 21 to be connected to one external electrode is the same as the number of layers of the dummy electrodes 19, 21 to be connected to the other external electrode.

In addition to the advantages described for the laminated ceramic capacitor 1 according to the first embodiment of the present invention, the laminated ceramic capacitor 101 according to the second embodiment of the present invention has another advantage as follows.

In the dummy electrodes 19, 21, as set forth above, a plurality of layers to be connected to one external electrode are gathered together, and a plurality of layers to be connected to the other external electrode are also gathered together. Therefore, there is no need to provide more than one pair of adjacent dummy electrodes 19, 21 of opposite polarities, effectively preventing the occurrence of short-circuit between adjacent dummy electrodes 19, 21 in the outer portions 11, 13. This advantage can be obtained more or less as long as each outer portion has at least three layers of dummy electrodes and these dummy electrodes include at least one pair of adjacent dummy electrodes of the same polarity. Based on this understanding, accordingly, the second embodiment may be modified such that each outer portion has three or five or more layers of dummy electrodes (for example, see FIGS. 8, 9, 10).

Figure 4:
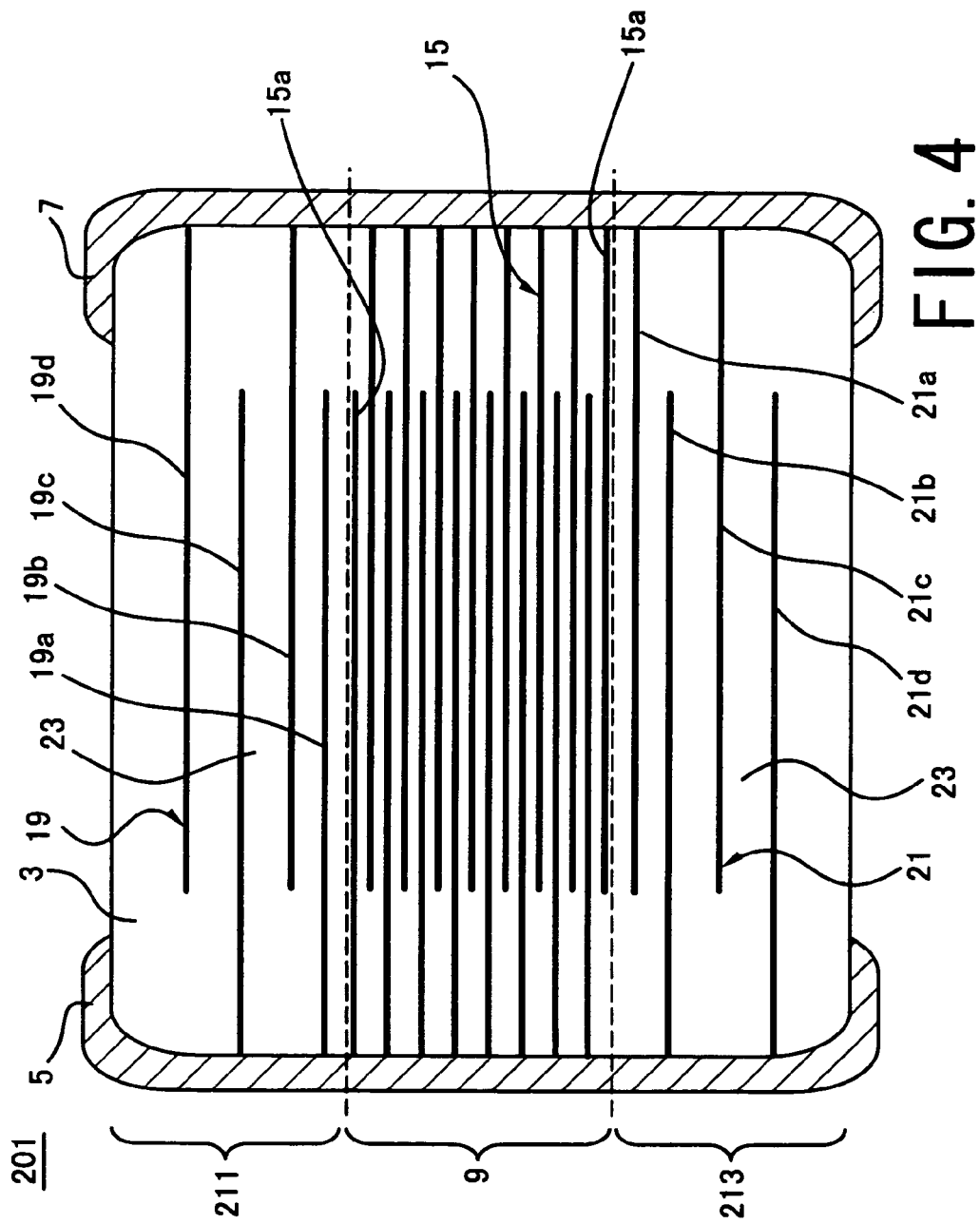
FIG. 4 is a longitudinal sectional view showing a laminated ceramic capacitor according to a third embodiment of the present invention.

Next will be described a laminated ceramic capacitor according to a third embodiment of the present invention. FIG. 4 is a sectional view corresponding to FIG. 1 and showing a laminated ceramic capacitor 201 of the third embodiment. The laminated ceramic capacitor 201 differs from the first embodiment in arrangement of dummy electrodes in a pair of outer portions 211, 213 disposed above and below the inner portion 9, but has the same construction in the other portions as the first embodiment.

In the third embodiment, four layers of dummy electrodes 19, 21 are embedded in the outer portions 211, 213, respectively. The dummy electrodes 19, 21 are opposed to one another with the dielectric layers 23 therebetween.

The distance between adjacent dummy electrodes 19 (21) increases with distance from the inner portion 9. In detail, the dummy electrode 19*b* (21*b*) and the dummy electrode 19*c* (21*c*) are spaced more than the dummy electrode 19*a* (21*a*) and the dummy electrode 19*b* (21*b*). In addition, the dummy electrode 19*c* (21*c*) and the dummy electrode 19*d* (21*d*) are spaced more than the dummy electrode 19*b* (21*b*) and the dummy electrode 19*c* (21*c*)

In addition to the advantages described for the laminated ceramic capacitor 1 according to the first embodiment of the present invention, the laminated ceramic capacitor 201 according to the third embodiment of the present invention has another advantage as follows.

In the outer portions 211, 213, as set forth above, the distance between adjacent dummy electrodes 19, 21 increases with distance from the inner portion 9. Therefore, the effect due to embedment of the dummy electrodes 19, 21 smoothly changes with distance from the inner portion 9, too. This further enhances the effect of moderating the change in shrinkage to have a higher effect on preventing the occurrence of cracks.

Figure 5:
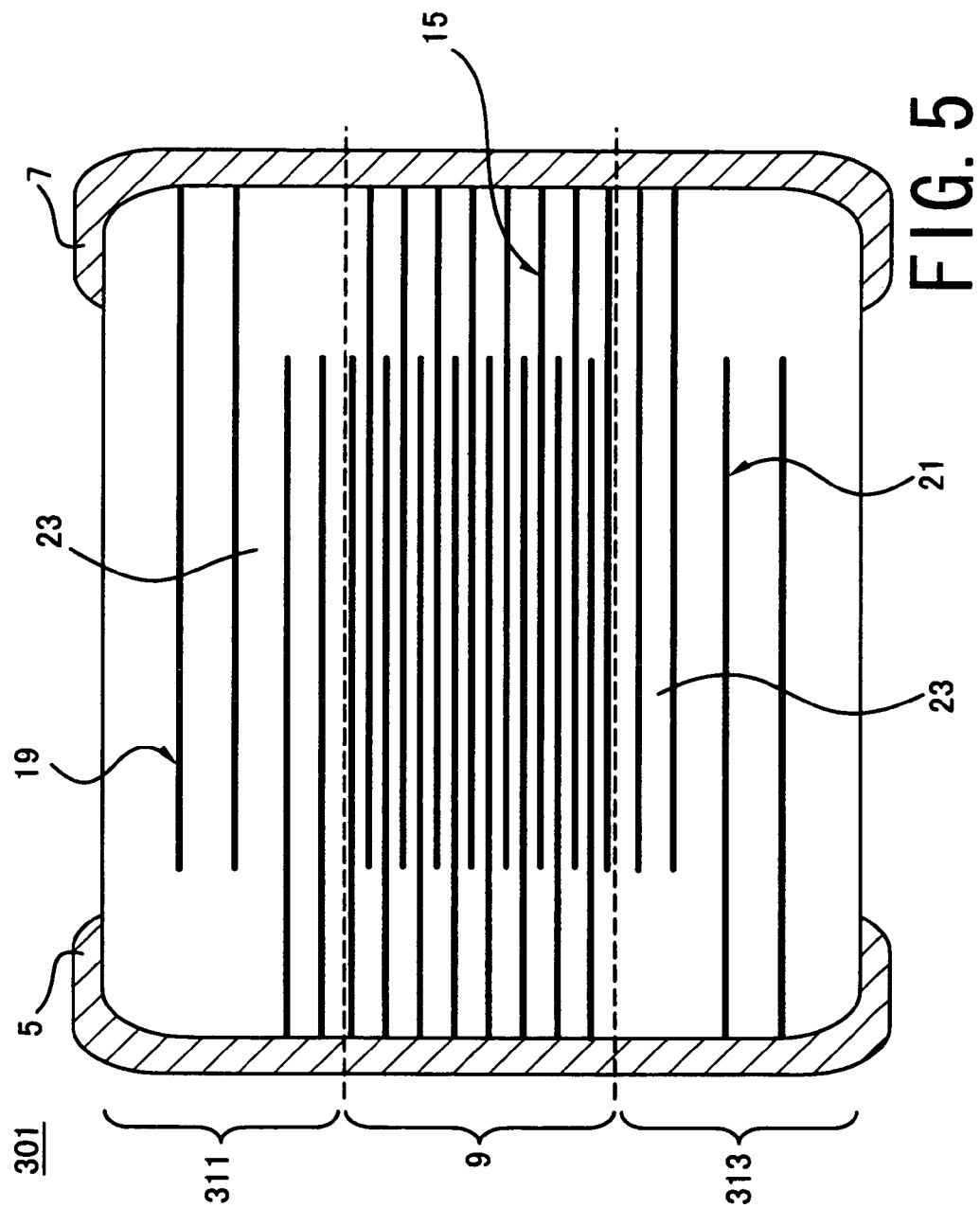
FIG. 5 is a longitudinal sectional view showing a laminated ceramic capacitor according to a fourth embodiment of the present invention.

Next will be described a laminated ceramic capacitor according to a fourth embodiment of the present invention. FIG. 5 is a sectional view corresponding to FIG. 3 and showing a laminated ceramic capacitor 301 of the fourth embodiment. The laminated ceramic capacitor 301 differs from the second embodiment in arrangement of dummy electrodes in a pair of outer portions 311, 313 disposed above and below the inner portion 9, but has the same construction in the other portions as the second embodiment.

In the fourth embodiment, the dummy electrodes 19, 21 are connected to the external electrodes 5, 7 in the same manner as in the second embodiment and spaced apart from each other in the same manner as in the third embodiment. Therefore, the fourth embodiment has not only the advantage described for the second embodiment but also the advantage described for the third embodiment.

While the present invention has been particularly shown and described with reference to the preferred embodiments thereof, it will be understood by those skilled in the art that various changes in form and detail may be made therein without departing from the spirit, scope and teaching of the invention.

For example, the present invention should not be limited to the foregoing embodiments where four layers of dummy electrodes are provided in each outer portion, but can be satisfactorily embodied with at least two layers of dummy electrodes. FIGS. 6 to 10 show embodiments whose outer portion has two, three, five or six layers of dummy electrodes. Although only the upper outer portion is depicted in these drawings, the dummy electrodes 21 may be similarly arranged in the lower outer portion.

Figure 6:
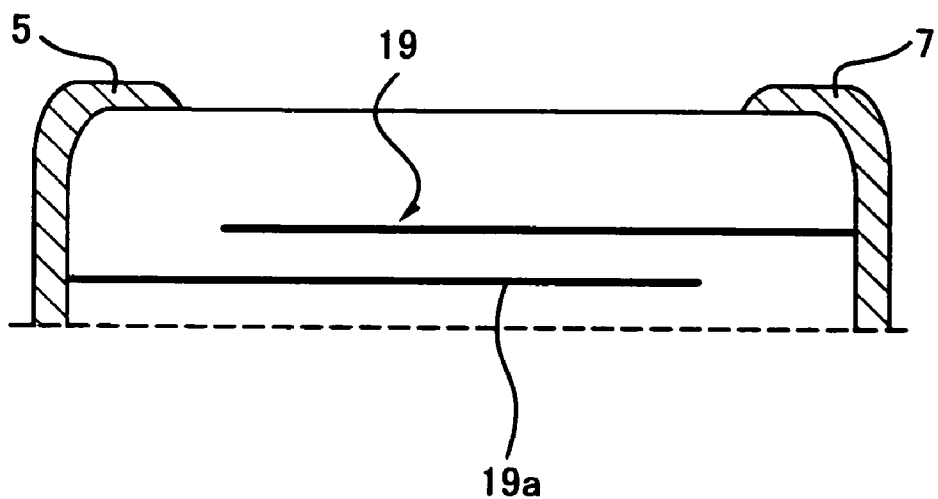
FIG. 6 is a longitudinal sectional view showing an outer portion of a laminated ceramic capacitor according to still another embodiment of the present invention.
Figure 7:
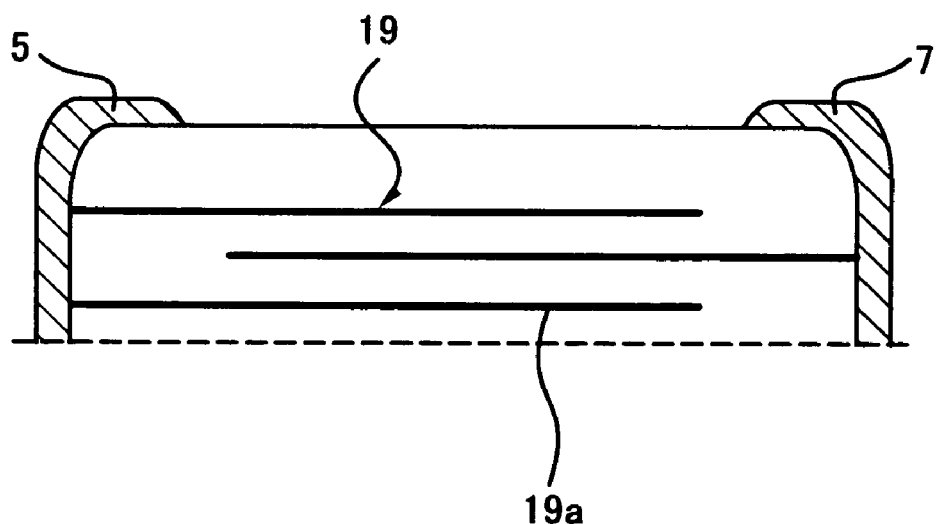
FIG. 7 is a longitudinal sectional view showing an outer portion of a laminated ceramic capacitor according to still another embodiment of the present invention.

In detail, FIGS. 6 and 7 show embodiments where less than four layers of dummy electrodes are provided in each outer portion to change in polarity every layer as in the first embodiment. Also in these embodiments, the innermost dummy electrode 19a has the same polarity as the corresponding outermost internal electrode, and the dummy electrodes 19 include at least one pair of adjacent dummy electrodes of opposite polarities.

Figure 8:
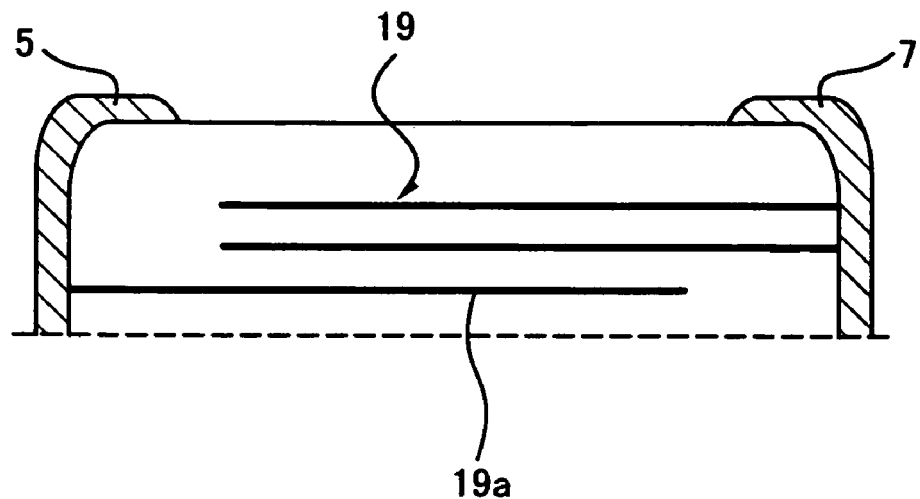
FIG. 8 is a longitudinal sectional view showing an outer portion of a laminated ceramic capacitor according to still another embodiment of the present invention.
Figure 9:
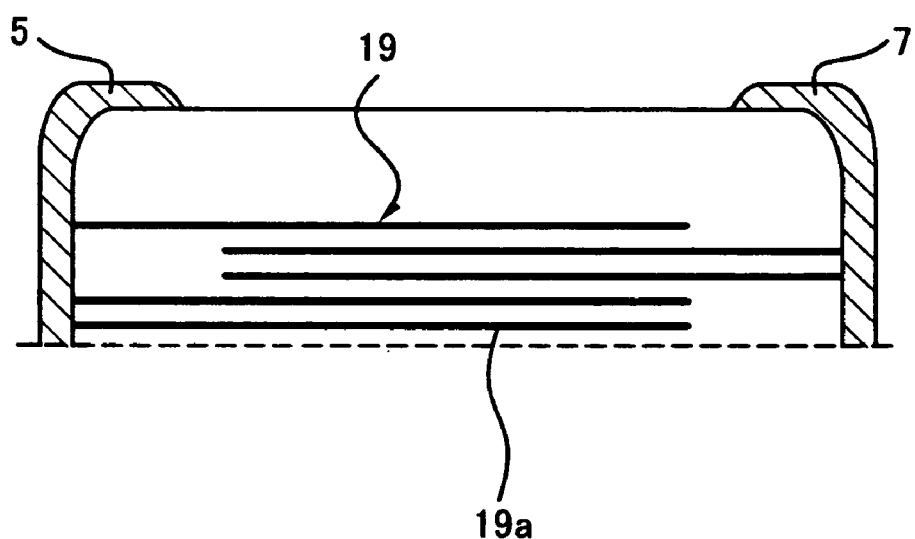
FIG. 9 is a longitudinal sectional view showing an outer portion of a laminated ceramic capacitor according to still another embodiment of the present invention.
Figure 10:
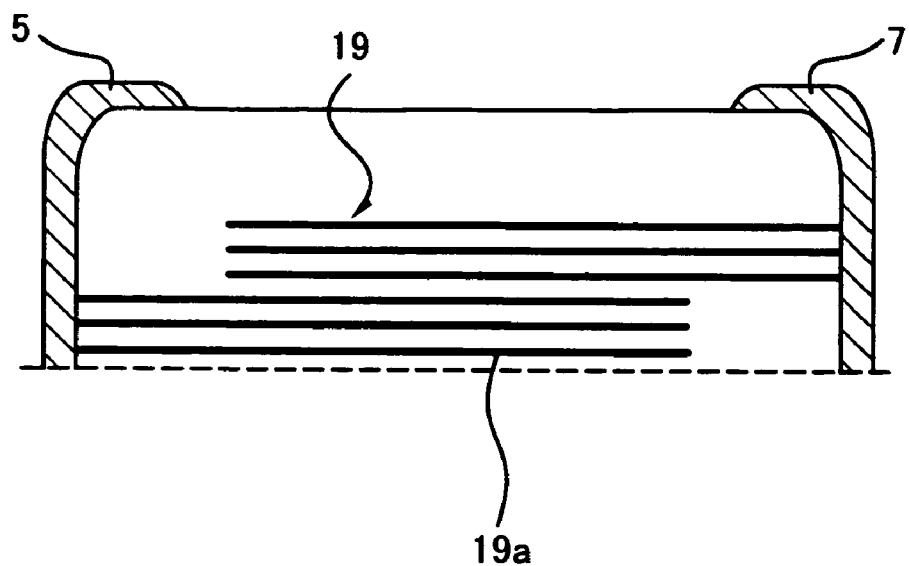
FIG. 10 is a longitudinal sectional view showing an outer portion of a laminated ceramic capacitor according to still another embodiment of the present invention.

FIG. 8 shows an embodiment where less than four layers of dummy electrodes are provided in each outer portion and a plurality of layers of dummy electrodes to be connected to the same external electrode are stacked as a unit as in the second embodiment. On the other hand, FIGS. 9 and 10 show embodiments where five or more layers of dummy electrodes are provided in each outer portion and a plurality of layers of dummy electrodes to be connected to the same external electrode are stacked as a unit as in the second embodiment. Also in these embodiments, the innermost dummy electrode 19a has the same polarity as the corresponding outermost internal electrode, and the dummy electrodes 19 include at least one pair of adjacent dummy electrodes of opposite polarities and at least one pair of adjacent dummy electrodes of the same polarity.

Figure 11:
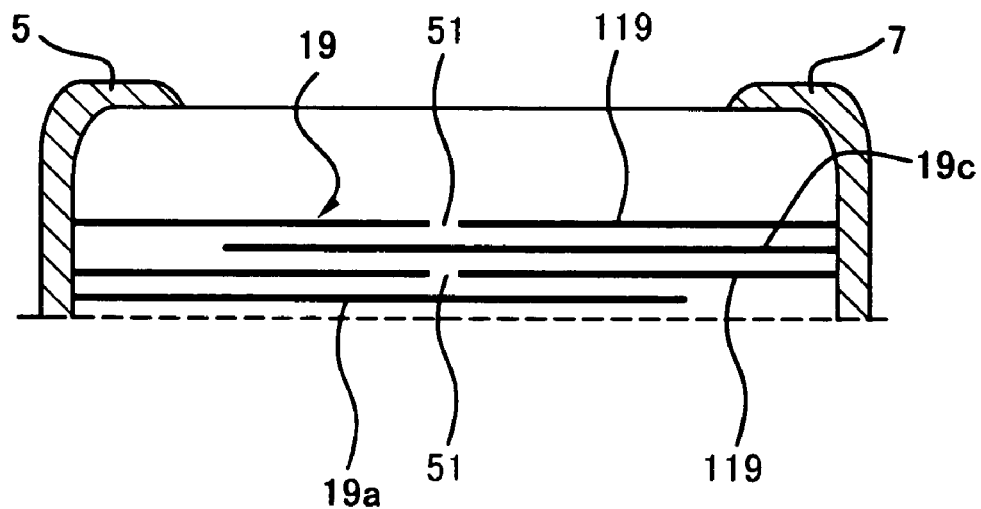
FIG. 11 is a longitudinal sectional view showing an outer portion of a laminated ceramic capacitor according to still another embodiment of the present invention.

As shown in FIG. 11, furthermore, at least one layer (two layers in FIG. 11) of the dummy electrodes 19 may be adapted as a dummy electrode 119 which is connected to both the external electrodes 5, 7 with a separation 51 midway therebetween for insulation. The dummy electrode 119, which can be connected to both the external electrodes 5, 7 without causing short-circuit because of the separation 51, contributes to improving the connection strength of the external electrodes 5, 7. In addition, since the dummy electrode 119 can exist over a wide area of the outer portion, the effect of moderating the change in shrinkage can be further enhanced to prevent the occurrence of cracks more reliably.

Although not shown in the drawings, furthermore, the distance between adjacent dummy electrodes may also increase with distance from the inner portion in the embodiments shown in FIGS. 6 to 11, as described with reference to the third and fourth embodiments.

What is claimed is:

1. A laminated electronic component comprising:
   a ceramic body having an inner portion and a pair of outer portions disposed above and below said inner portion; and
   a pair of external electrodes disposed on lateral sides of said ceramic body,
   wherein a plurality of internal electrodes are embedded in said inner portion and alternately connected to said external electrodes, and
   at least two layers of dummy electrodes are embedded in at least one of said outer portions and each connected to one of said external electrodes,
   wherein an innermost one of said dummy electrodes has a same polarity as an adjacent outermost one of said internal electrodes, and said dummy electrodes include at least one pair of adjacent dummy electrodes of opposite polarities.

2. The laminated electronic component of claim 1, wherein at least three layers of dummy electrodes are disposed and alternately connected to said external electrodes to change in polarity every layer.

3. The laminated electronic component of claim 1, wherein at least three layers of dummy electrodes are disposed to include at least one pair of adjacent dummy electrodes of a same polarity.

4. The laminated electronic component of claim 1, wherein at least three layers of dummy electrodes are disposed such that a distal pair of adjacent dummy electrodes are spaced more than a proximal pair of adjacent dummy electrodes relative to said inner portion.

5. The laminated electronic component of claim 1, wherein said dummy electrodes are made of a same material as said internal electrodes.

* * * * *